(12) United States Patent
Goto

(10) Patent No.: US 7,663,877 B2
(45) Date of Patent: Feb. 16, 2010

(54) ELECTRONIC APPARATUS AND COOLING COMPONENT

(75) Inventor: Katsuichi Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 290 days.

(21) Appl. No.: 11/484,697

(22) Filed: Jul. 12, 2006

(65) Prior Publication Data

US 2007/0240869 A1    Oct. 18, 2007

(30) Foreign Application Priority Data

Apr. 14, 2006    (JP)    .............................. 2006-111587

(51) Int. Cl.
  *H05K 7/20*    (2006.01)
  *H01L 23/467*    (2006.01)
(52) U.S. Cl. .................. 361/679.48; 361/694; 361/695; 361/704; 361/714
(58) Field of Classification Search .................. 361/690, 361/695, 694, 679.48, 704, 714, 679.49, 361/687
See application file for complete search history.

(56) References Cited

U.S. PATENT DOCUMENTS

| | | | | |
|---|---|---|---|---|
| 4,286,642 | A | * | 9/1981 | Keatley ........................ 411/112 |
| 4,568,243 | A | * | 2/1986 | Schubert et al. .......... 415/213.1 |
| 4,621,304 | A | * | 11/1986 | Oogaki et al. ................ 361/720 |
| 4,807,718 | A | * | 2/1989 | Lotz ............................ 181/202 |
| 5,186,605 | A | * | 2/1993 | Tracy ............................. 601/2 |
| 5,208,730 | A | * | 5/1993 | Tracy .......................... 361/687 |
| 5,316,423 | A | * | 5/1994 | Kin ............................. 411/510 |
| 5,409,055 | A | * | 4/1995 | Tanaka et al. .......... 165/104.33 |
| 5,731,952 | A | * | 3/1998 | Ohgami et al. .............. 361/687 |
| 5,969,941 | A | * | 10/1999 | Cho ........................... 361/687 |
| 2001/0004546 | A1* | | 6/2001 | Tobita et al. ................. 438/519 |
| 2001/0040789 | A1* | | 11/2001 | Tanaka et al. ............... 361/687 |
| 2002/0084060 | A1* | | 7/2002 | Sasaki et al. ................ 165/80.3 |
| 2003/0072134 | A1* | | 4/2003 | Ishikawa et al. ............ 361/687 |
| 2003/0229174 | A1* | | 12/2003 | Goto et al. ................... 524/588 |
| 2004/0001316 | A1* | | 1/2004 | Kamikawa et al. .......... 361/700 |
| 2005/0045310 | A1* | | 3/2005 | Okutsu et al. .............. 165/80.3 |
| 2005/0190541 | A1* | | 9/2005 | Yang et al. .................. 361/719 |
| 2006/0133048 | A1* | | 6/2006 | Kobayashi et al. .......... 361/720 |

FOREIGN PATENT DOCUMENTS

| | | |
|---|---|---|
| CN | 2304151 | 1/1999 |
| CN | 2483754 | 3/2002 |
| CN | 2515800 | 10/2002 |

(Continued)

OTHER PUBLICATIONS

Office Action issued Jun. 27, 2008 in corresponding Chinese Patent Application No. 200610108376.X.

(Continued)

*Primary Examiner*—Anatoly Vortman
(74) *Attorney, Agent, or Firm*—Staas & Halsey LLP

(57) ABSTRACT

An electronic apparatus of the present invention includes a radiation rubber. The radiation rubber is brought into firm contact with both a frame of an air-cooling fan unit and a housing of the electronic apparatus such as a notebook personal computer. The heat of a fan unit is transferred to the housing through the radiation rubber, and the housing is utilized as a radiator.

5 Claims, 9 Drawing Sheets

FOREIGN PATENT DOCUMENTS

| | | | | |
|---|---|---|---|---|
| JP | 01266587 | A | * | 10/1989 |
| JP | 05243434 | A | * | 9/1993 |
| JP | 11143585 | A | * | 5/1999 |
| JP | 11-238984 | | | 8/1999 |
| JP | 2001142023 | A | * | 5/2001 |
| JP | 2004031854 | A | * | 1/2004 |
| KR | 2000-0003113 | | | 2/2000 |

OTHER PUBLICATIONS

Office Action issued in corresponding Korean Patent Application No. 10-2006-0074078, on Aug. 29, 2007.

* cited by examiner

ELECTRONIC APPARATUS AND COOLING COMPONENT

BACKGROUND OF THE INVENTION

1. Field of the Invention

The present invention relates to an electronic apparatus such as a notebook personal computer, and a cooling component used in the electronic apparatus.

2. Description of the Related Art

Various electronic apparatus, such as the notebook personal computer, are provided with circuit components, and heat generation is associated with operation in some of the circuit components. Therefore, some electronic apparatus have a configuration in which air cooling is performed by providing a fan unit therein.

Japanese Patent Application Laid-Open No. 11-238984 discloses a configuration including an electronic apparatus having a main body and an external device on which the electronic apparatus is mounted. In the configuration, the heat of the main body is transferred to the external device, and the heat is radiated on the external device side.

The heat is also generated by rotation of the fan unit in itself, and a temperature rise of the fan unit contributes to the temperature rise in the electronic apparatus. Therefore, there is a problem that the temperature rise of the fan unit needs to be suppressed.

SUMMARY OF THE INVENTION

The present invention has been made in view of the above circumstances and provides an electronic apparatus which decreases the contribution of the air-cooling fan unit incorporated into the electronic apparatus to the temperature rise in the electronic apparatus, and a cooling component used for the electronic apparatus.

An electronic apparatus of the invention includes: a housing in which an opening is formed; a fan unit which is fixed to a position located inside the housing, the position being adjacent to the opening, the fan unit causing an air flow to pass through the opening; and a heat conductor which is in contact with both a wall surface in the housing and the fan unit to transfer heat of the fan to the housing.

According to the electronic apparatus of the invention, the heat of the fan unit is transferred to the housing through the heat conductor. The housing is in contact with air outside the electronic apparatus in a wide area, and the housing serves as a radiation plate. Therefore, the temperature rise of the fan unit is suppressed to decrease the contribution of the fan unit to the temperature rise in the electronic apparatus.

In the electronic apparatus of the invention, the heat conductor may be an elastic heat conductor, or the heat conductor may be a radiation rubber.

When the elastic heat conductor is used, the elastic heat conductor can be brought into firm contact with both the surface of the fan unit and the wall surface in the housing to improved heat transfer efficiency. It is also possible to prevent transmission of vibration generated by the operation of the fan unit to the housing.

In the electronic apparatus of the invention, the housing may have a bottom wall and a sidewall, the opening may be formed in the sidewall, and the heat conductor may be in contact with both an upper surface of the fan unit and an inner wall surface of the sidewall. In the electronic apparatus of the invention, the housing may have a bottom wall and a sidewall, the opening may be formed in the sidewall, and the heat conductor may be in contact with both a lower surface of the fan unit and an inner wall surface of the bottom wall.

The electronic apparatus of the invention may include a main unit which has a main-unit housing, the opening being provided in the main-unit housing; and a display unit which is supported by the main unit while being openable and closable, wherein the fan unit and the heat conductor are incorporated into the main-unit housing. In this case, the opening may be formed in a sidewall of the main-unit housing.

Furthermore, the invention also provides a cooling component, used in the electronic apparatus, which includes the fan unit and the heat conductor.

According to the invention, the temperature rise of the fan unit can be suppressed, and the temperature rise caused by the temperature rise of the fan unit can be suppressed in the electronic apparatus. It is also possible to prevent the transmission of the vibration generated by the operation of the fan unit to the housing.

DETAILED DESCRIPTION OF THE INVENTION

An embodiment of the invention will be described below.

Figure 1:
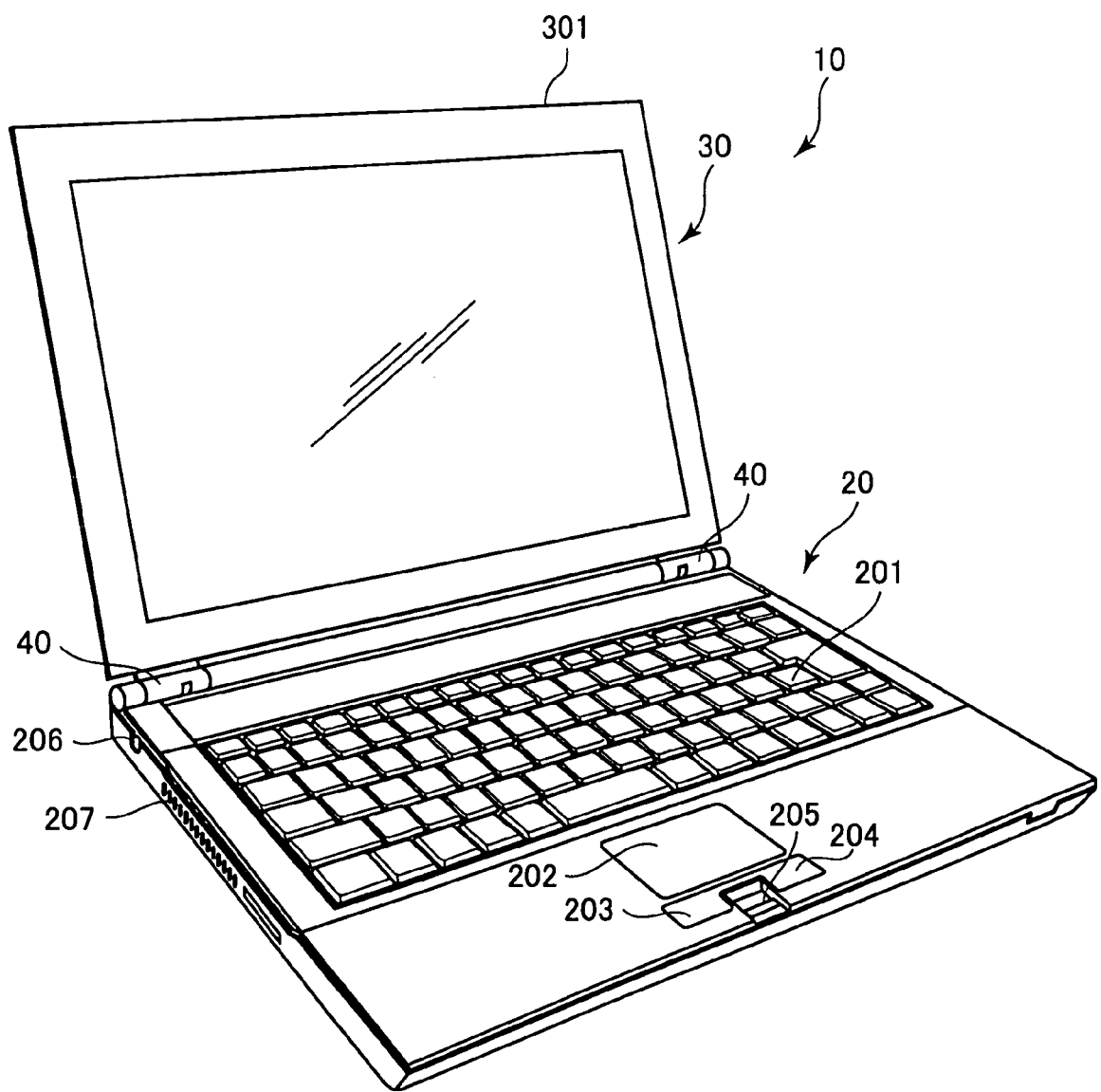
FIG. 1 is a schematic perspective view showing a notebook personal computer, which is of an embodiment of an electronic apparatus of the invention.
Figure 2:
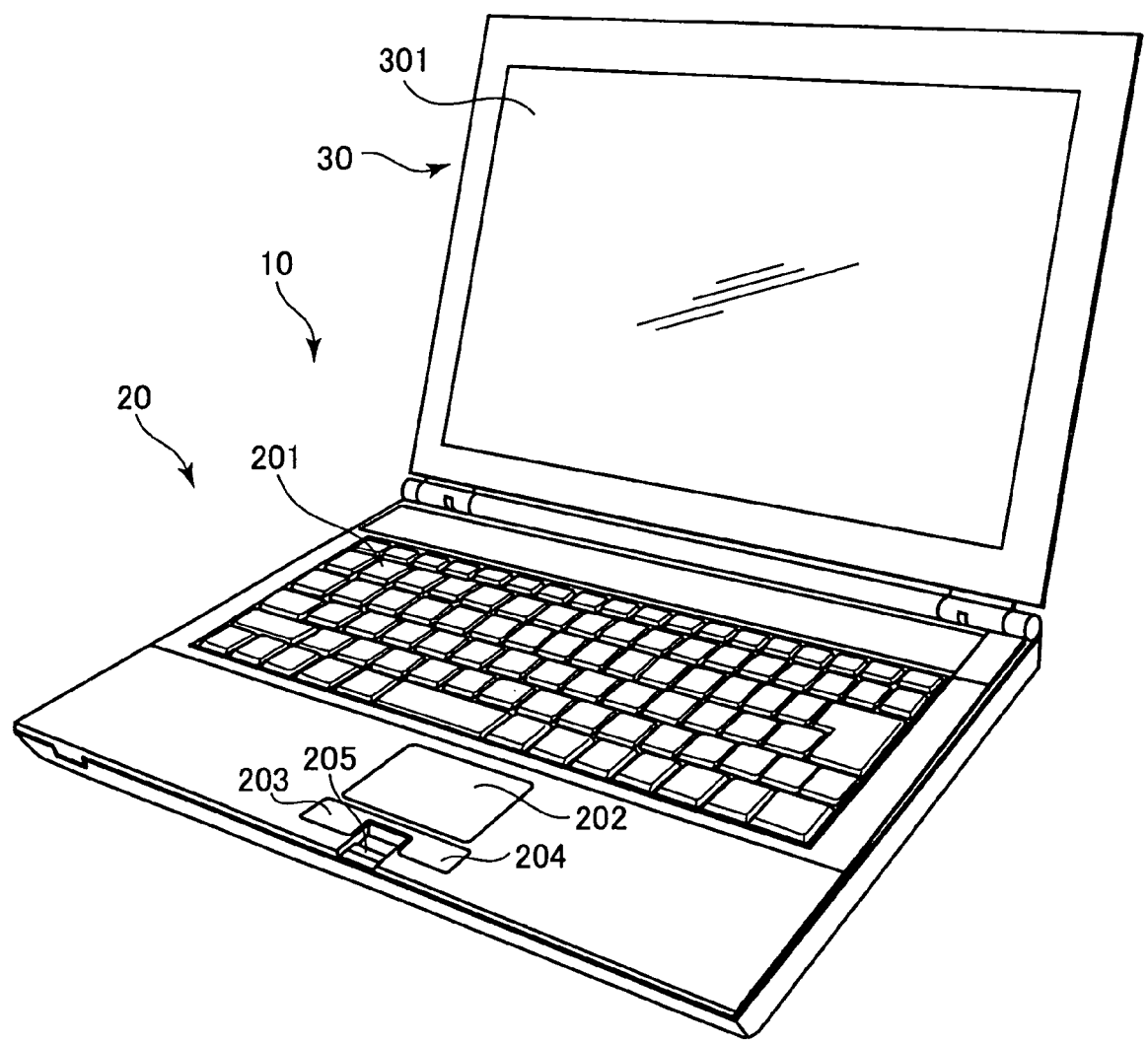
FIG. 2 is a schematic perspective view showing the notebook personal computer, which is of the embodiment of the electronic apparatus of the invention when viewed from an angle different from FIG. 1.

FIGS. 1 and 2 are schematic perspective views showing a notebook personal computer 10 (hereinafter abbreviated to "notebook PC"), which is of an embodiment of an electronic apparatus of the invention when viewed from different angles.

The notebook PC 10 includes a main unit 20 and a display unit 30. The display unit 30 is supported by hinge sections 40 while being openable and closable with respect to the main unit 20.

The main unit 20 has a substantially rectangular housing. A keyboard 201, a touch pad 202, a left click button 203 and a right click button 204 for the touch pad 202, a fingerprint sensor 205, and the like are provided in an upper surface of the housing. A DC power supply connection terminal 206, an air-outlet opening section 207, and the like are provided in a left side face of the main unit 20.

The display unit 30 has a large display screen 301 in a front face thereof.

The hinge sections 40 have such a structure that enables the display unit 30 to be supported while being openable and closable with respect to the main unit 20. The hinge sections 40 are provided at substantial both ends in a crosswise direction of a side of the display unit 30 facing the main unit 20.

It is necessary that the display unit 30 stay at any opened angle with respect to the main unit 20 while being rotatable to the main unit 20. Therefore, the hinge sections 40 also take a role for imparting friction such that the display unit 30 stays at any opened angle with respect to the main unit 20.

Figure 3:
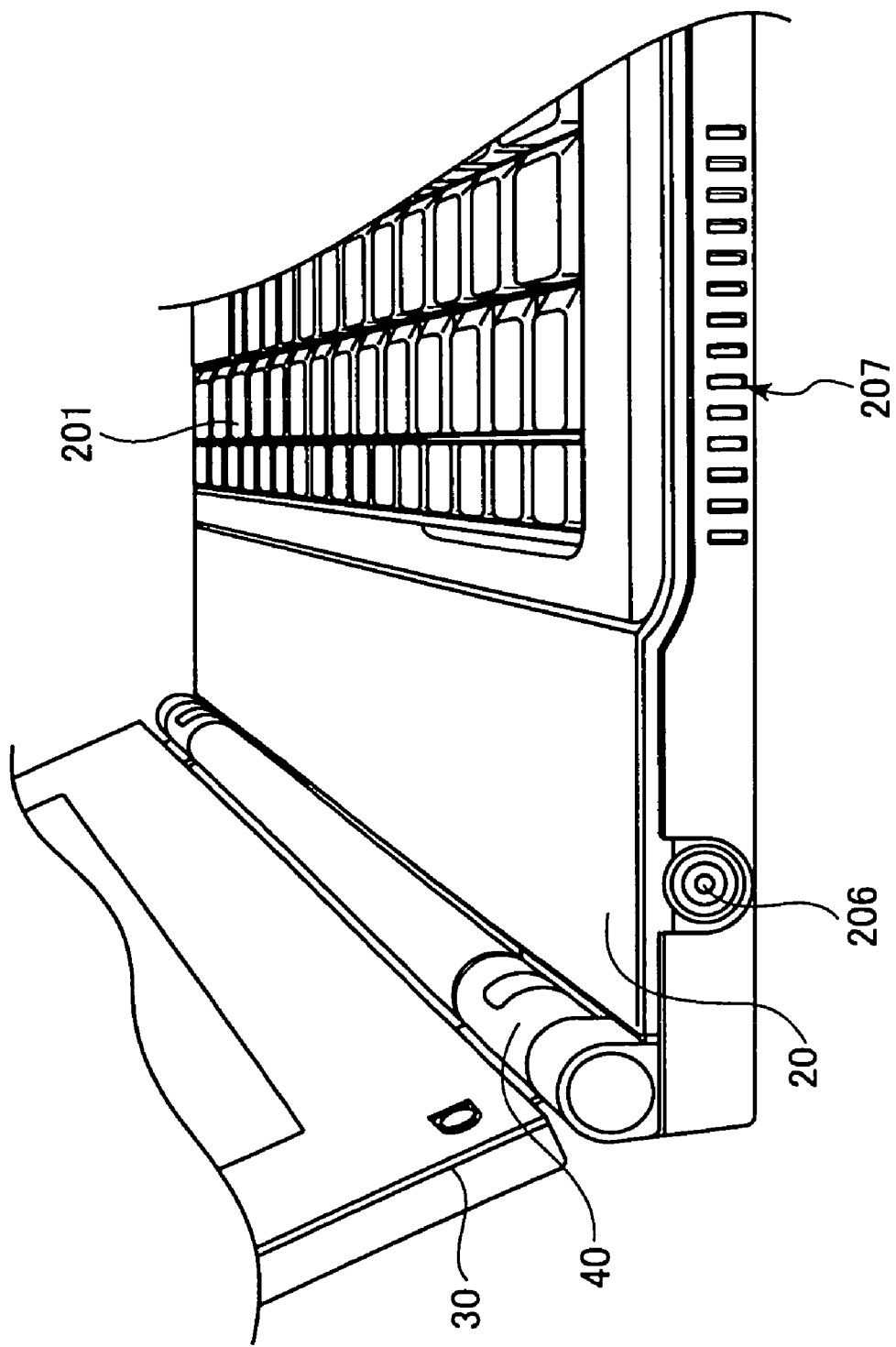
FIG. 3 is an enlarged view showing a part of a left surface of a main unit in the notebook personal computer shown in FIGS. 1 and 2.

FIG. 3 is an enlarged view showing a part of a left surface of the main unit 20 shown in FIGS. 1 and 2.

In the embodiment, as shown in FIG. 3, the air-outlet opening section 207 is composed of plural small openings.

Figure 4:
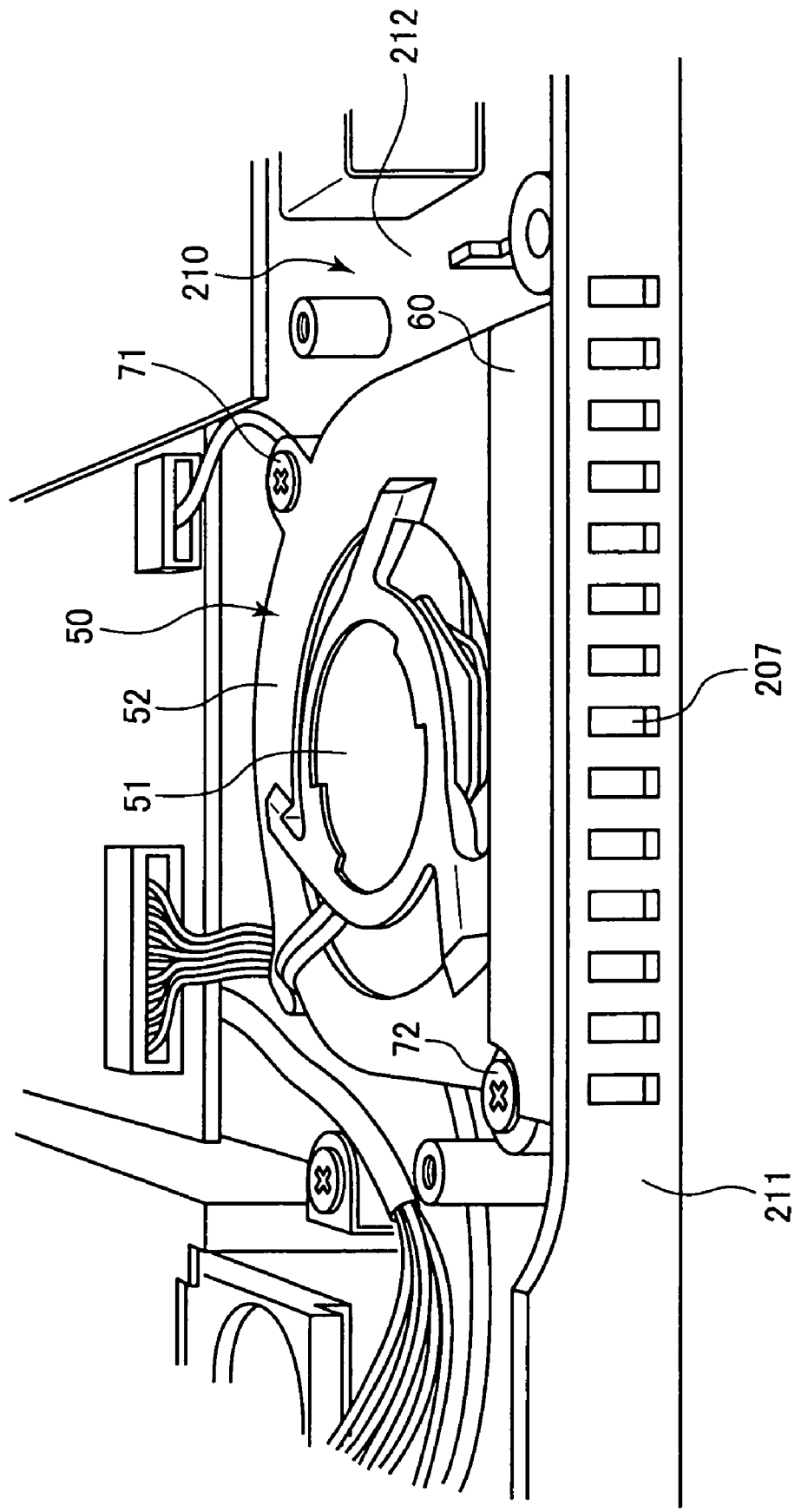
FIG. 4 is a perspective view showing an inside of an opening of the main unit while a keyboard and the like are detached.
Figure 5:
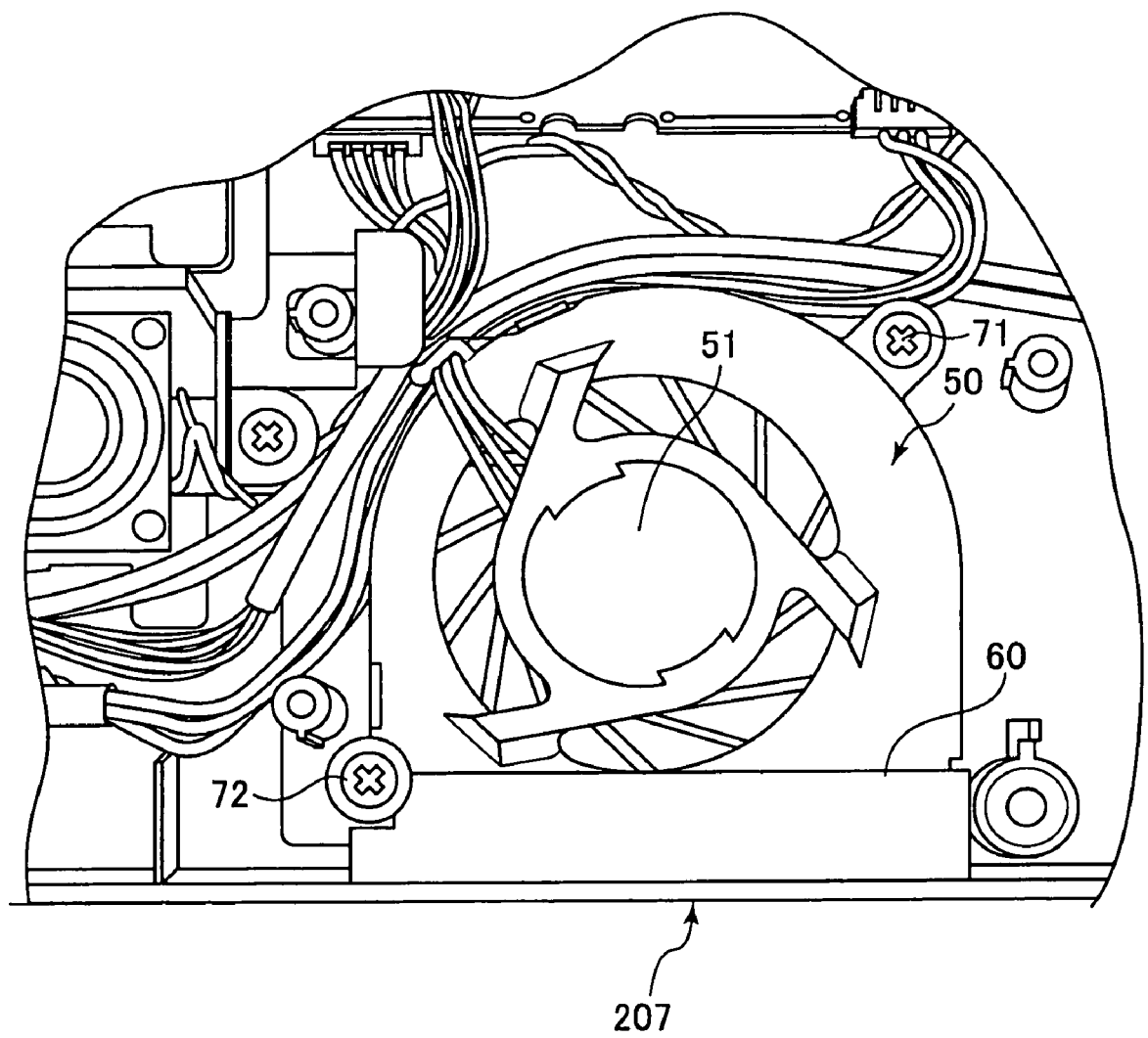
FIG. 5 is a plan view showing the same portion as FIG. 4.
Figure 6:
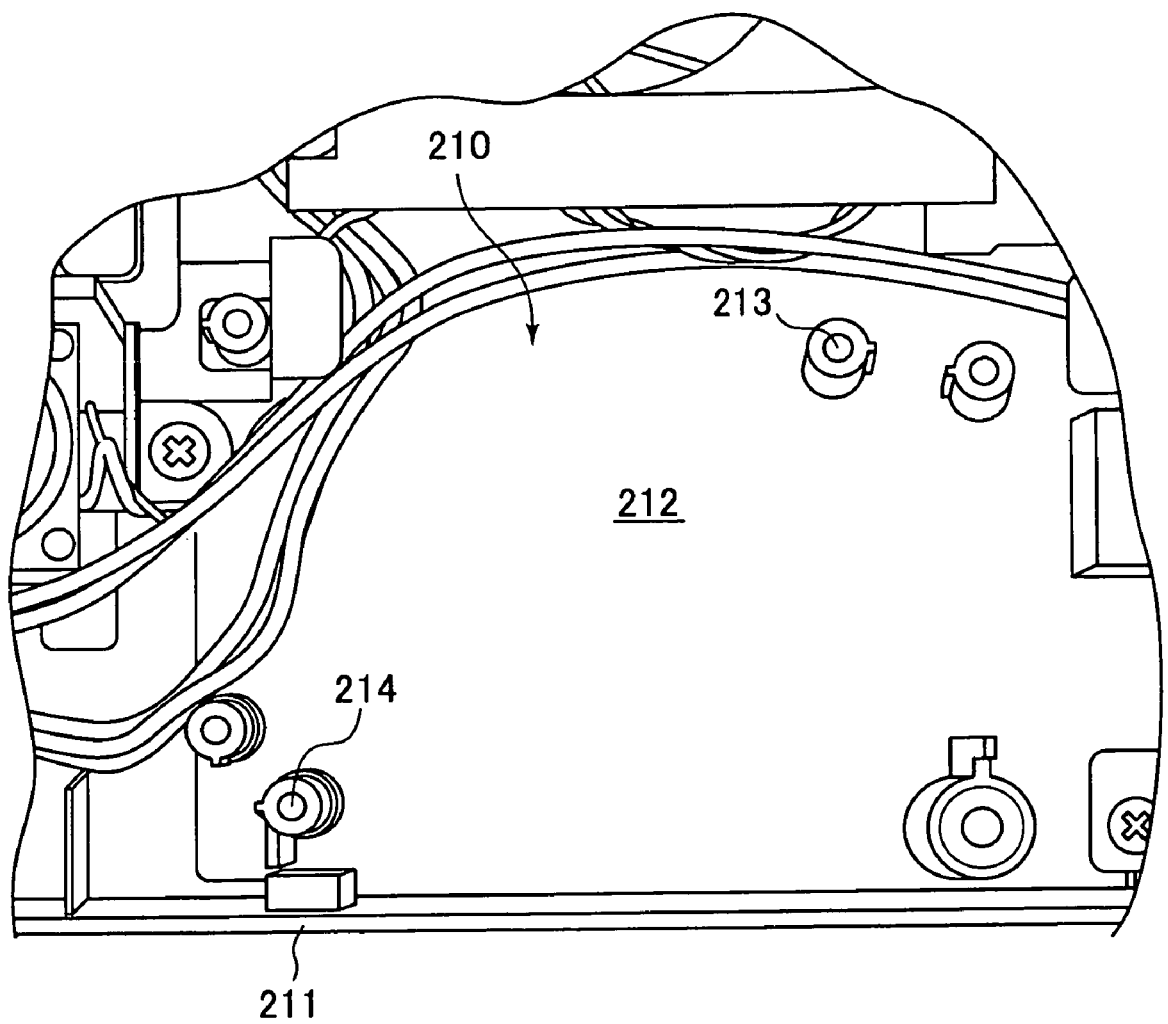
FIG. 6 is a plan view showing the same portion as FIG. 5 while a fan unit is detached.

FIG. 4 is a perspective view showing the inside of the opening 207 of the main unit 20 while the keyboard 201 and the like are detached, and FIG. 5 is a plan view showing the same portion as FIG. 4. FIG. 6 is a plan view showing the same portion as FIG. 5 while a fan unit is detached.

A housing 210 of the main unit 20 is made of metal. As shown in FIG. 6, the housing 210 has a left side face 211 and a bottom surface 212, and two fan unit attaching bosses 213 and 214 are vertically provided on the bottom surface 212. An internal thread for screwing a fan unit 50 is made in each of the bosses 213 and 214.

As shown in FIGS. 4 and 5, the fan unit 50 is arranged immediately inside the air-outlet opening section 207 formed in the left side face 211 of the housing 210 in the main unit 20, and the fan unit 50 is screwed in threaded holes made in the bosses 213 and 214 shown in FIG. 6 by screws 71 and 72. The fan unit 50 is used to air-cool the inside of the main unit 20, and the fan unit 50 includes a fan 51 that discharges the air in the main unit 20. The fan unit 50 has the structure in which the fan 51 is supported by a metal frame 52. The fan 51 includes a vane wheel having plural vanes and a motor for rotating the vane wheel.

As shown in FIGS. 4 and 5, a radiation rubber 60 is provided at a position where the radiation rubber 60 is in contact with both the upper surface of the fan unit 50 and the left side face 211 of the housing 210 in the main unit 20. The radiation rubber 60 is bonded to the upper surface of the frame 52 of the fan unit 50, and the radiation rubber 60 is pressed against the left side face 211 of the housing 210 in the main unit 20 by attachment of the fan unit 50. The combination of the fan unit 50 and the radiation rubber 60 corresponds to an example of the cooling component according to the invention.

Figure 7:
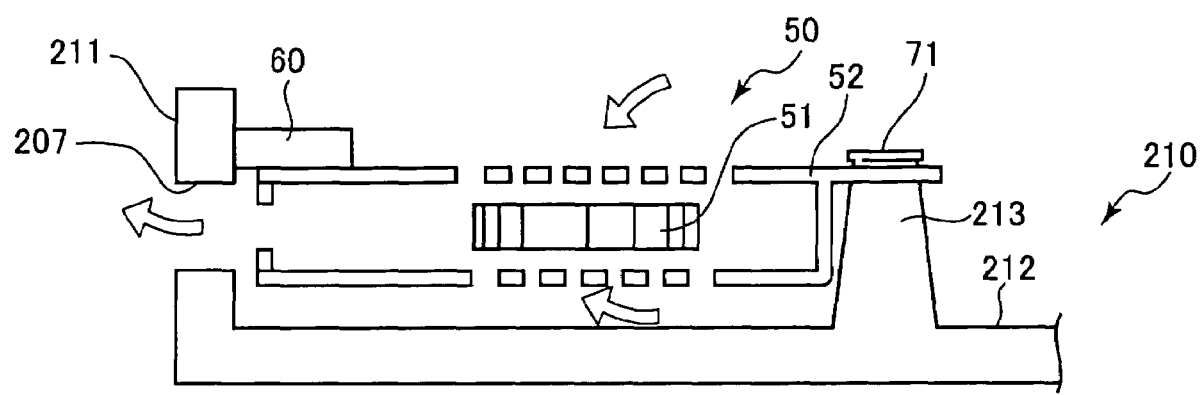
FIG. 7 is a schematic view of a fan unit attached portion.

FIG. 7 is a schematic view of a fan unit attached portion.

In FIG. 7, airflow is shown by arrows.

The fan unit 50 is fixed to the bosses 213 and 214 by the screws 71 and 72 (see FIGS. 4 and 5), which allows the fan unit 50 to float from the bottom surface 212 of the housing 210 of the main unit 20. Air-inlet openings are formed in both the upper and lower surfaces of the fan unit 50, and an air-outlet opening is formed at the position where the fan unit 50 faces the opening 207 formed in the left side face 211 of the main unit 20. The air is sucked in from the upper and lower surfaces by the rotation of the fan 51 while discharged from the opening 207 in the left side face 211 of the main unit 20.

The radiation rubber 60 is bonded to the upper surface of the frame 52 of the fan unit 50, and the radiation rubber 60 is pressed against the inside of the left side face 211 in the housing 210 of the main unit 20 by screwing the fan unit 50. Because the radiation rubber 60 is made of an elastic material, the radiation rubber 60 comes into firm contact with the inside of the left side face 211 in the housing 210 of the main unit 20 to keep good heat transfer efficiency. The heat of the fan unit 50 is transferred through the radiation rubber 60 to the left side face 211 in the housing 210 of the main unit 20, and the housing 210 of the main unit 20 serves as a radiator. Therefore, the temperature rise of the fan unit 50 is suppressed, and the temperature rise caused by the heat generation of the fan unit 50 is suppressed in the main unit 20.

Silicone rubber and the like can be adopted as the radiation rubber 60. Preferably a thermally conductive acrylic elastomer and the like are adopted to prevent the generation of siloxane gas that causes contact failure. For example, the thermally conductive acrylic elastomer has thermal conductivity of about 2.3 W/m·K.

Now, another method of attaching the radiation rubber will be described.

Figure 8:
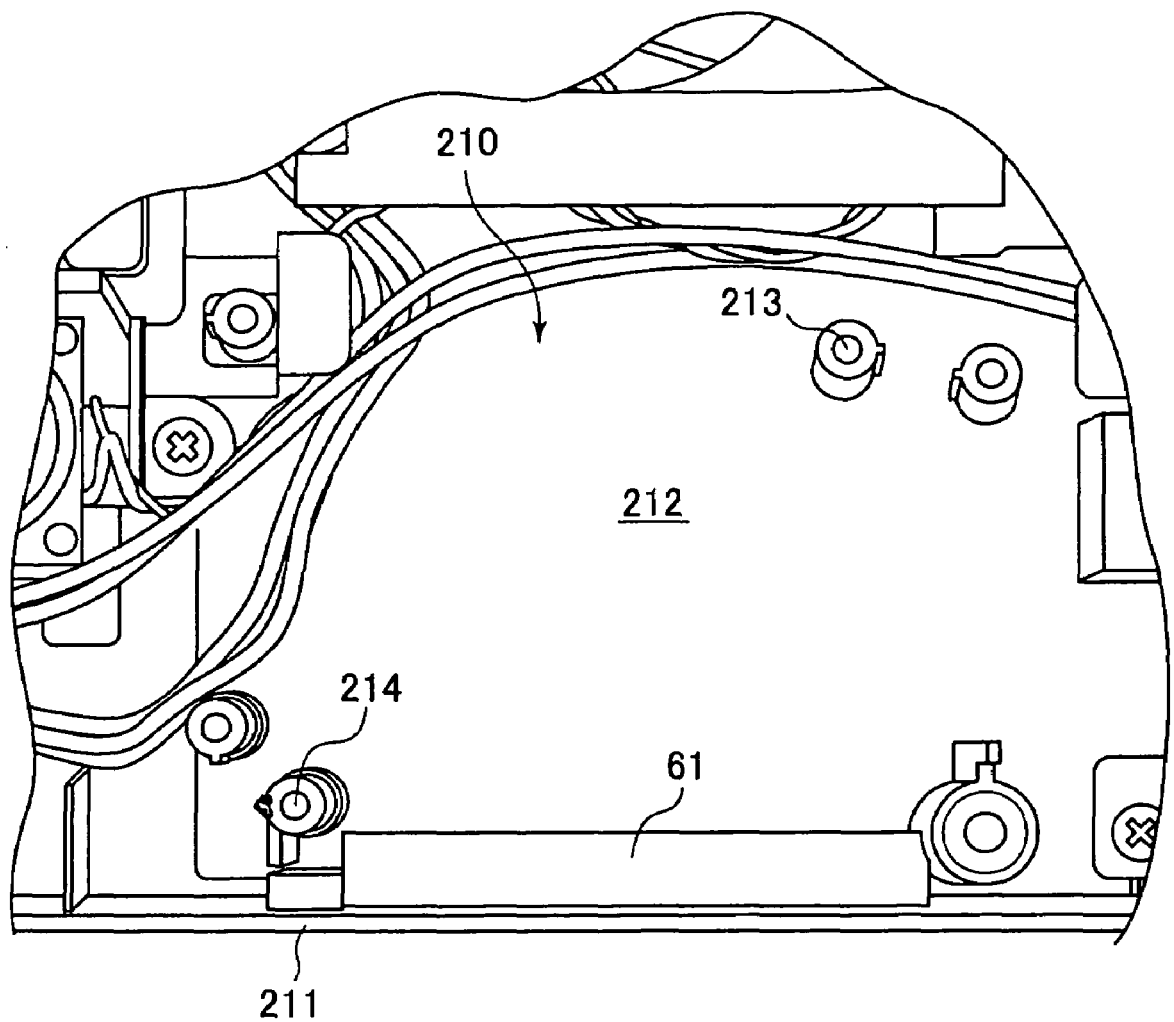
FIG. 8 is a plan view showing the fan unit attached portion of a housing of the main unit while the fan unit is detached.
Figure 9:
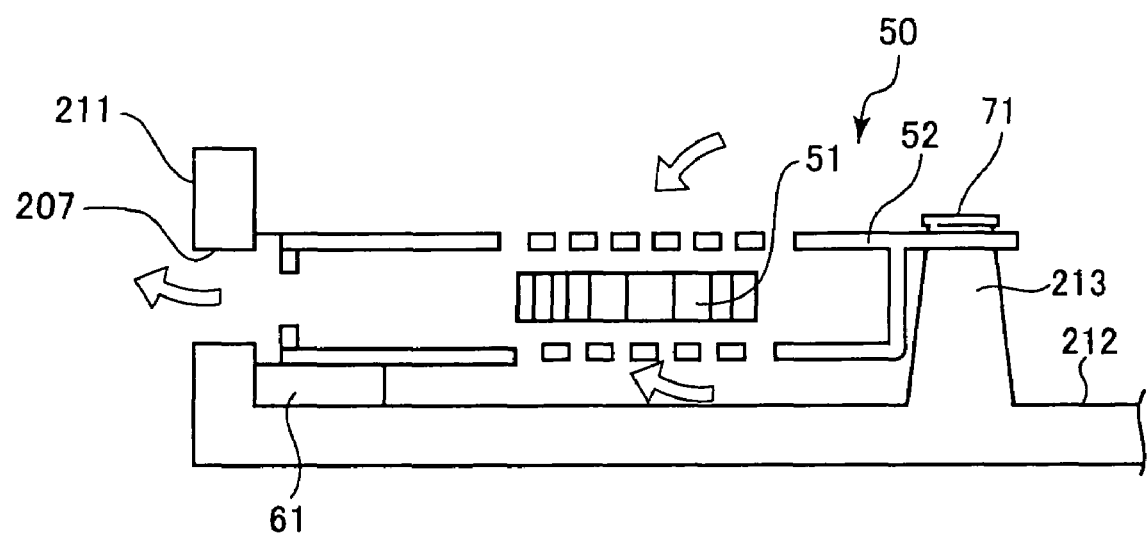
FIG. 9 is a schematic view of the fan unit attached portion.

FIG. 8 is a plan view showing the fan unit 50 attached portion of the main unit while the fan unit is detached, and FIG. 9 is a schematic view of the fan unit attached portion.

As shown in FIGS. 8 and 9, when a radiation rubber 61 is bonded to the bottom surface 212 of the housing 210 of the main unit 20 to screw the fan unit 50, the radiation rubber 61 is sandwiched between the bottom surface 212 of the housing 210 of the main unit 20 and the lower surface of the frame 52 of the fan unit 50, and the radiation rubber 61 is brought into firm contact with both the bottom surface 212 of the housing 210 of the main unit 20 and the lower surface of the frame 52 of the fan unit 50.

In this case, the heat of the fan unit 50 is transferred through the radiation rubber 61 to the bottom surface 212 of the housing 210 of the main unit 20, and the housing 210 of the main unit 20 is utilized as a radiator.

Thus, in the method shown in FIGS. 8 and 9, the radiation rubber 61 serving as an elastic radiator is used as the heat conductor which transfers the heat of the fan unit 50 to the housing 210 of the main unit 20, and the radiation rubber 61 comes into firm contact with both the fan unit 50 and the housing 210 of the main unit 20. Therefore, the high heat transfer efficiency is secured.

In addition, in either of the above-described attachment methods, the transmission of the vibration, which is generated by the operation of the fan 51 of the fan unit 50, i.e., the rotation of the vane wheel by the motor included in the fan 51, to the housing 210 of the main unit 20 can be prevented by absorbing the vibration with the radiation rubbers 60 and 61 which is of the heat conductor.

What is claimed is:

1. An electronic apparatus comprising:
an information processing section;
a housing which has an upper wall, a bottom wall, and a side wall in which an air-discharge opening is formed;
a fan unit which has an upper surface, a lower surface, a side surface, an air inlet formed in each of the upper surface and the lower surface, and an air outlet formed in the side surface, and which is fixed, in a state in which the air outlet is directed to the air-discharge opening and a space for taking air is formed between the lower surface and the bottom wall and between the upper surface and the upper wall, to a position located inside the housing and adjacent to the air-discharge opening; and
a heat conductor which is in contact with both an inner wall surface of the side wall at a position adjacent to the air-discharge opening and at least one of the upper surface and the lower surface at a position adjacent to the air-discharge opening to transfer heat of the fan unit to the housing.

2. The electronic apparatus according to claim 1, wherein the heat conductor is an elastic heat conductor.

3. The electronic apparatus according to claim 1, wherein the heat conductor is a radiation rubber.

4. The electronic apparatus according to claim 1, further comprising:
- a main unit which has a main-unit housing, the air-discharge opening being provided in the main-unit housing; and
- a display unit which is supported by the main unit while being openable and closable, wherein the fan unit and the heat conductor are incorporated into the main-unit housing.

5. The electronic apparatus according to claim 4, wherein the air-discharge opening is formed in a sidewall of the main-unit housing.

* * * * *